Patented Dec. 12, 1939

2,182,774

UNITED STATES PATENT OFFICE 2,182,774

COMPOSITION FOR APPLICATION TO PULLEYS AND THE LIKE

Joseph Birnbaum, Vienna, Austria, assignor to Manhattan Lubricants Co., Inc., Brooklyn, N. Y., a corporation of New York No Drawing. Application May 21, 1937, Serial No. 143,979

5 Claims. (Cl. 106—7.5)

This invention relates to compositions for coating or covering pulleys.

Among the objects of my invention is to provide a composition of the character described for increasing the traction between pulleys and belts and for the like purposes, and which composition shall be comparatively simple and cheap to produce and yet effective and efficient in operation to a high degree.

Other objects of this invention will in part be obvious and in part hereinafter pointed out.

I accomplish these objects generally by the provision of a composition which, when applied to the pulley face, not only presents a rough friction surface, but also has depressions or pores, which provide a suction effect between the surface and belt, thereby materially increasing the traction effect and reducing slippage to a high degree.

My composition is composed of a suitable base, such as nitro-cellulose, to which is added some substance such as a plastic cellulose composition containing a finely divided filler such as wood flour designed to create a plurality of minute projections on a dried surface, whereby the coating upon drying will have a roughened surface, and some oxidizable metal particles such as iron filings. The latter readily oxidize upon exposure to the air, and are rather rapidly disintegrated or worn off, leaving small depressions or pores in the surface, whereby appreciable effective suction is produced between the pulley face and the belt.

The following is an example of my composition which I have found to produce good results:

To 100 parts, by weight, of nitro-cellulose I add 10 parts of a plastic cellulose composition containing wood flour and 5 parts of iron filings, 20 to 30 parts of an organic solvent, such for example as acetone, ether or the like, may be added as a thinner.

The composition thus produced may then be applied very simply, by means of a brush or other suitable means, to the pulley surface and is applicable equally well to metal or wood pulleys. The coating or covering so produced upon the face of the pulley will have upon its surface the iron filings, which will readily oxidize to give the suction effect hereinabove described.

The plastic composition containing wood flour mixes readily with the nitro-cellulose, being itself a cellulose product, and thus the mixture as a whole forms a heterogeneous plastic composition, which dries with an uneven rough surface and may be readily applied by brush to form a coating.

Other substances having like characteristics may, of course, be employed in place of said plastic composition containing wood flour and, instead of iron filings, any metal particles that are oxidizable and insoluble in nitro-cellulose or organic solvents may be employed.

It will thus be seen that there is provided a composition and process in which the several objects of this invention are achieved, and which are well adapted to meet the conditions of practical use.

As various embodiments might be made of the above invention, and as various changes might be made in the matter hereinabove set forth, it is to be understood that all matter herein set forth is to be interpreted as illustrative and not in a limiting sense.

Having thus described my invention, I claim as new and desire to secure by Letters Patent:

1. A composition adapted to be applied by brushing for coating the surface of belt pulleys and the like, comprising nitro-cellulose, a volatile solvent for said nitro-cellulose and iron filings which is adapted upon drying to form a roughened surface having depressions or pores, whereby increased traction between the said pulley and belt is obtained both by friction and suction.

2. A composition adapted to be applied by brushing for coating the surface of belt pulleys and the like, comprising nitro-cellulose and a volatile solvent for said nitro-cellulose which is adapted upon drying to form a roughened surface, said composition including metal particles adapted upon exposure to air to rapidly disintegrate and produce depressions or pores in said roughened surface, whereby increased traction between said belt and pulley is obtained both by friction and suction.

3. A composition adapted to be applied by brushing for coating the surface of belt pulleys and the like, comprising nitro-cellulose, a volatile solvent for said nitro-cellulose and wood flour which is adapted upon drying to form a roughened surface, said composition including metal particles adapted upon exposure to air to rapidly disintegrate and produce depressions or pores in said roughened surface whereby increased traction between said belt and pulley is obtained by both friction and suction.

4. A composition adapted to be applied by brushing for coating the surface of belt pulleys and the like, comprising nitro-cellulose, a volatile solvent for said nitro-cellulose and a plastic composition including wood flour, said coating composition being adapted upon drying to form a roughened surface, said coating composition additionally including metal particles adapted upon exposure to air to rapidly disintegrate and produce depressions or pores in said roughened surface whereby increased traction between said belt and pulley is obtained by both friction and suction, the weight of said plastic composition content being substantially twice the weight of the metal particle content.

5. A composition adapted to be applied by brushing for coating the surface of belt pulleys and the like, comprising, by weight, substantially 100 parts of nitro-cellulose and 10 parts of a plastic composition which includes wood flour, said coating composition being adapted upon drying to form a roughened surface, said composition additionally including about 5 parts by weight of metal particles adapted upon exposure to air to rapidly disintegrate and produce depressions or pores in said roughened surface whereby increased traction between said belt and pulley is obtained by both friction and suction.

JOSEPH BIRNBAUM.